July 5, 1960
W. L. CARLSON, JR
2,944,127
CONDUCTIVE FLUID RELAY
Filed May 16, 1957
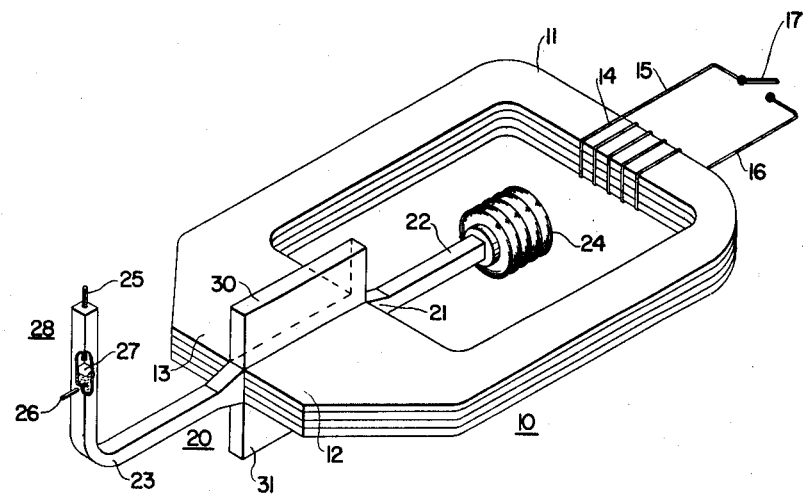
INVENTOR.
WILLIAM L. CARLSON, JR.
BY Joseph E Ryan
ATTORNEY

United States Patent Office 2,944,127
Patented July 5, 1960

2,944,127

CONDUCTIVE FLUID RELAY

William L. Carlson, Jr., Bloomington, Minn., assignor to Minneapolis-Honeywell Regulator Company, Minneapolis, Minn., a corporation of Delaware Filed May 16, 1957, Ser. No. 659,632

3 Claims. (Cl. 200—112)

The present invention relates to a conductive fluid type of relay and more specifically is directed to a relay having a variable impedance flux path which can be remotely controlled to operate the relay.

To understand the operation of the present device the theory behind the function in a conductive fluid device will be explained. The basic principle which must be understood to appreciate the present invention is that a conductive liquid or fluid may be moved under the influence of an electric current and a magnetic field which are mutually perpendicular to one another. This principle was recognized by Faraday, and devices which move conductive fluid in this manner are normally referred to as Faraday pumps. The Faraday pump has become quite common in laboratory work and in connection with the movement of liquid sodium annd liquid sodium-potassium in nuclear reactors. Basically, the Faraday pump uses the induction motor principle, that is, the conductive liquid is considered to be a wire or conductor suspended in a magnetic field and has a current passed mutually perpendicular to the length of the conductor and the magnetic field. Under these conditions, a force is induced in the conductor which tends to move it in a direction which is mutually perpendicular to the current and flux. This force, when applied to a liquid conductor, propels the liquid conductor in the same manner as a conventional pump.

It is further understood that whenever a current flows a magnetic field exists around that current. It is also known that if an alternating flux exists, a conductor linked thereby has a current induced therein. If the magnetic field or flux is properly utilized with respect to the flow of current it becomes apparent that a conductive fluid can be readily moved under their joint influence. It will be further appreciated that if the current is substantially constant, and the impedance of the flux path can be varied, that the effect of the combination on the conductive fluid will also vary. The variance when properly controlled can raise or lower the level of a conductive fluid in a current control device, such as a tube containing two electrodes. When the electrodes are operated upon by the movement of the fluid an electrical circuit can therewith be controlled.

The present device finds particular utility in that a relatively large current can be controlled by controlling a very small current. The small control current is the result of the flux linkages between the magnetic circuit and an encircling coil which is used to change the magnetic circuit impedance. The current induced in the encircling coil can be small, yet an adequate change in the impedance can be created to properly change the pressure and operate the main current control circuit.

It is the object of this invention to disclose a conductive fluid device wherein the current flowing through the device creates its own magnetic field, which may be controlled, and therein provides the necessary current and mutually perpendicular flux to create a controlled pumping action.

It is a further object of the present invention to disclose a conductive fluid relay wherein the mutually perpendicular flux and current operate a current control device in response to variations in the strength of the magnetic field.

Still a further object of the present disclosure is to present a relay which utilizes a coil and short circuiting means to vary the impedance of the flux field of a conductive fluid relay so that a small control current is all that is needed to operate a relatively large current control device.

These and other objects will become apparent when the present disclosure is considered fully with the single drawing which is a schematic representation of the device embodied in a conductive fluid relay. It should be understood that the device has been presented in schematic only as the principles of operation of this unique device can be applied to numerous specific physical configurations.

The specifically disclosed embodiment of a conductive fluid relay has a laminated magnetic structure generally shown at 10. It should be understood, however, that in certain versions of this device the laminated structure 10 could be replaced by any solid magnetic material. The structure 10 is in a general C-shaped form having a yoke 11 and two poles 12 and 13. The yoke 11 is encircled by a coil 14 having leads 15 and 16 which in turn are connected to a switch 17. The switch 17 can be any form of current control device of the off-on type or one which varies the impedance across the leads 15 and 16 in any other manner.

The pole members 12 and 13 define a gap into which is placed a tube generally shown as 20. The tube 20 has an intermediate section 21 placed directly between the poles 12 and 13 and further has extensions 22 and 23. The extension 22 of the tube 20 is completely sealed by a bellows 24. The opposite end of tube 20, extension 23, contains a current control means 28. This current control means has been specifically disclosed as a pair of electrodes 25 and 26 inserted in the end of tube 20 in such a manner that they can be short circuited by a conductive fluid 27. The conductive fluid substantially fills the tube 20 and bellows 24. This conductive fluid, however, comes in contact with electrode 25 only when the device is energized. It will be understood that the tube 20 may be of a conductive material or non-conductive material, depending on the desired construction, but if the tube 20 is of a conductive material the electrodes 25 and 26 must be insulated therefrom. The volume above the conductive fluid 27 in the tube extension 23 may either be evacuated or may contain a gas which does not react with the fluid 27. It is understood, however, that the volume contained in tube extension 23 above the conductive fluid 27 is adequate so that upon movement of the fluid 27 there is little or no pressure brought to bear on the surface of fluid 27 by the confined gas.

Adjacent to the sides of tube 20 in the gap formed between poles 12 and 13 there are inserted two electrodes 30 and 31. These electrodes are placed in perpendicular relationship to the poles 12 and 13 and are utilized to pass a current across tube 20 through its section 21. A source of high current at exceedingly low potential (not shown) is connected to the electrodes 30 and 31 so that a current path may be obtained between the electrodes 30 and 31 through the contained conductive fluid 27. It is further understood that the tube 20, when constructed of a conductive material, has a resistivity which is high enough so that only a small amount of the current passing between electrodes 30 and 31 is diverted through the walls of the tube. When the tube is manufactured of a non-conductive material the conductivity of the fluid contained and of the associated parts is relatively unimportant.

It is apparent that when a current flows from electrode 30 to electrode 31 that it will flow perpendicularly to any magnetic field which might exist across poles 12 and 13. As previously explained, whenever a current flows a magnetic field is generated thereby. It is therefore further obvious that the current flowing between electrodes 30 and 31 generates a magnetic flux in such a manner that it is readily conducted by the magnetic structure 10 and passes across the tube channel 21 in a manner perpendicular to the direction of flow of the current. A further analysis of the flux pattern will show that only one half of the current and flux link one another in a mutually perpendicular manner but this combination of current and flux is adequate to obtain a pumping pressure according to the Faraday pump principles. It will thus become apparent that whenever a current flows from electrode 30 to 31 a pumping pressure is exerted on the conductive fluid 27 and it is moved from the bellows 24 through the tube 29 into the current control means 28. As the conductive fluid is moved into the current control means 28, the fluid short circuits the terminals 25 and 26 to complete any desired circuit.

Whenever it is desired to break the circuit between electrodes 25 and 26 it is only necessary to close switch 17. Upon closing switch 17 a current is drawn in coil 14 by transformer action and this in effect increases the impedance of the magnetic circuit 10. Upon increasing the impedance of the magnetic circuit 10 the flux available for operation of the pumping function is decreased with an associated decrease in pressure. The decrease in pressure allows the conductive fluid 27 to drop in the current control section 28 and thereby open circuit electrodes 25 and 26.

It can be seen that by the proper design of the parameters of the present conductive fluid relay it would be possible to obtain a complete on-off operation of the circuit through electrodes 25 and 26 by operation of the switch 7. It is further obvious that by placing a variable impedance between conductors 15 and 16 this same function could be obtained. Also, an additional energizing winding could be added to the yoke 11 and electrodes 30 and 31 could be shorted together. With this arrangement an induced current would be present in electrodes 30 and 31 whenever an alternating current was connected to the energizing winding. By shorting coil 14 the device could still be operated as the impedance of the magnetic structure would be changed and the pressure varied.

As previously pointed out, the representation presented is schematic only and the principles disclosed could be applied to numerous physical configurations. It is further obvious that the present principle could be applied directly to a conductive fluid pump per se, as well as to the presently embodied relay. Since many variations of the principles involved will become apparent to those skilled in the art, the applicant wishes to be limited in scope only by the claims appended to the present specification.

I claim as my invention:

1. In a relay of the class described wherein an electric current passes through a conductive fluid at substantially right angles to a magnetic flux to propel the fluid in a direction mutually perpendicular to said current and said flux to operate current control means: fluid containing means including fluid reservoir means; variable impedance magnetic structure means adjacent said fluid containing means to conduct said fluid across said fluid; flux control means associated with said magnetic structure means; and current carrying means electrically independent of said flux control means conducting said current to said fluid; said flux control means varying the impedance of said magnetic structure means to vary said flux; the flux and the current in turn propelling said fluid to operate said current control means.

2. In a relay of the class described wherein an electric current passes through a conductive fluid at substantially right angles to a magnetic flux to propel the fluid in a direction mutually perpendicular to said current and said flux to operate current control means; channel means including reservoir means containing said fluid; variable magnetic structure means having a variable impedance and including poles adjacent opposite sides of said fluid channel means to conduct said flux through said channel means; a coil encircling said magnetic structure and including a second current control means; and electrode means adjacent said channel and electrically independent of said coil to conduct said current through said fluid in said channel means; said coil and said second current control means varying the impedance of said magnetic structure means to vary the amount of flux flowing between said poles; said flux and said current propelling the fluid to operate said first current control means.

3. In a relay of the class described wherein an electric current passes through a liquid metal at substantially right angles to a magnetic flux to propel the liquid in a direction mutually perpendicular to said current and said flux to short circuit electrical contacts: a closed channel having a reservoir and containing said liquid metal; a U-shaped magnetic structure having a pair of poles adjacent opposite sides of said channel to conduct said flux across said liquid metal in said channel; a coil of wire encircling the magnetic structure and including a switch; said magnetic structure varying in impedance upon operation of said switch; and a pair of electrodes electrically independent of said coil and adjacent opposite sides of said channel to conduct said current across the liquid metal; said switch short circuiting said coil to vary the impedance of the magnetic structure and thereby vary the flux flow in said channel; said flux flow and said current propelling the liquid metal in the channel to short circuit said contacts.

References Cited in the file of this patent

UNITED STATES PATENTS

| 1,747,044 | Bainbridge | Feb. 11, 1930 |
| 1,773,036 | FitzGerald | Aug. 12, 1930 |